United States Patent
Matsumoto et al.

(10) Patent No.: US 7,475,995 B2
(45) Date of Patent: Jan. 13, 2009

(54) PROJECTOR TRAPEZOIDAL CORRECTION

(75) Inventors: Morio Matsumoto, Matsumoto (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 460 days.

(21) Appl. No.: 11/278,902

(22) Filed: Apr. 6, 2006

(65) Prior Publication Data
US 2006/0227298 A1 Oct. 12, 2006

(30) Foreign Application Priority Data
Apr. 6, 2005 (JP) ............... 2005-109637

(51) Int. Cl.
G03B 21/00 (2006.01)
G03B 21/14 (2006.01)
G09G 5/00 (2006.01)
H04N 3/23 (2006.01)
H04N 3/22 (2006.01)
G06K 9/40 (2006.01)

(52) U.S. Cl. ............... 353/69; 353/70; 345/647; 345/204; 348/746; 348/806; 382/254; 382/255

(58) Field of Classification Search ............... 353/69, 353/70; 345/647, 204; 348/746, 806; 382/254, 382/255
See application file for complete search history.

(56) References Cited

U.S. PATENT DOCUMENTS 7,252,386 B2 8/2007 Matsumoto
7,334,899 B2 * 2/2008 Kobayashi ............... 353/69

FOREIGN PATENT DOCUMENTS

| EP | 1 385 335 A1 | 1/2004 |
|---|---|---|
| EP | 1 427 199 A2 | 6/2004 |
| EP | 1 463 311 A1 | 9/2004 |
| EP | 1 508 876 A2 | 2/2005 |
| EP | 1 519 576 A1 | 3/2005 |
| JP | A-2000-241874 | 9/2000 |
| JP | A-2005-318510 | 11/2005 |
| KR | 2006 0044952 A | 5/2006 |

OTHER PUBLICATIONS

Extended European Search Report issued Jul. 13, 2006 for European Patent Application No. 06007189.1—2217.

* cited by examiner

*Primary Examiner*—Diane I Lee
*Assistant Examiner*—Magda Cruz
(74) *Attorney, Agent, or Firm*—Oliff & Berridge, PLC

(57) ABSTRACT

A projector includes an image projecting section that is structured to project an image according to an input image, to a virtual projection plane arranged in a predetermined positional relationship therewith, an imaged-information generating section that has an output-image taking section to take an output image projected to a real projection plane and outputs imaged information containing lightness information having a correlation to a lightness in accordance with an image taken, and a distortion correcting section that corrects a distortion, in an output image for the input images, caused by an inclination of between the virtual and real projection planes, according to the imaged information.

7 Claims, 12 Drawing Sheets

PROJECTOR TRAPEZOIDAL CORRECTION

CROSS-REFERENCE TO RELATED APPLICATION

The present application claims priority from Japanese Patent Application No. 2005-109637 filed on Apr. 6, 2005 in Japan, the entire disclosure of which is hereby incorporated by reference.

BACKGROUND

The present invention relates to the art of projector trapezoidal correction.

There has been a recent dissemination of projectors arranged to project a video onto a screen. Such a projector is usually designed to basically face straight toward the screen. Where the projector is arranged so as not to face straight toward the screen, distortion is induced in the image.

When the projector is arranged not to face straight toward the screen, variation is encountered, not only in the image but also in its brightness distribution. Furthermore, where the projector is provided with an imager, the distance of imaging is not equal between the left of the screen versus the right of the screen. Due to the inverse-square law, the imager is to receive light in an amount different at the left and right of the screen. Such reception-light difference can be applied in estimating the screen inclination relative to the optical axis of the projector.

However, the reception light is varied not only by a screen inclination but also by such factors as individual differences or aging, in the projector projection system and imager optical system.

JP-A-2000-241874 is an example of a related art.

SUMMARY

An advantage of some aspect of the invention is to provide an art to improve the robustness in correction, in a projector that can be corrected for the image distortion resulting from screen inclination in accordance with on-screen lightness distribution.

According to a first aspect of the invention, there is provided a projector comprising: an image projecting section that is structured to project an image according to an input image, to a virtual projection plane arranged in a predetermined positional relationship therewith; an imaged-information generating section that has an output-image taking section to take an output image projected to a real projection plane, and outputs imaged information containing lightness information having a correlation to a lightness in accordance with an image taken; and a distortion correcting section that corrects a distortion, in an output image for the input image, caused by an inclination of between the virtual and real projection planes, according to the imaged information; the distortion correcting section having a correcting-image supply section that supplies, to the image projecting section, a correcting image for use in compensating for a distortion of the output image, and an image processing section that determines an amount of a peak shift of from a peak in lightness on the virtual projection plane to a peak in lightness on the real projection plane, according to the imaged information using the correcting image, and previously distorts the input image in a manner compensating for a distortion in the output image, according to the peak shift determined; the correcting-image supply section having a correcting-image modifying section that modifies the correcting-image in a manner approximating, to an angle of the inclination, an amount of an angular change caused responsive to the peak shift as viewing the peak from the image projecting section.

The projector of the invention has a correcting-image modifying section that modifies the correcting-image in a manner approximating, to an angle of the inclination, an amount of an angular change caused responsive to the peak shift as viewing the peak from the image projecting section. This makes it possible to reduce the inclination measurement error resulting from the individual difference of or aging in the projector. As a result, the image can be compensated for, with robustness, a distortion resulting from a screen inclination.

Here, "modifying a correcting image" is a broad concept including a generation of correcting-image data depending upon an entire-white pattern or another previously prepared reference pattern Meanwhile, "lightness information" is a broad concept including those values having a correlation to a physical amount concerning a light intensity, such as illuminance, brightness, lightness or imager's reception energy.

It is preferable that the correcting-image supply section modifies the correcting image in a manner approximating a projection characteristic of the image projecting section to a spot light source.

This makes it possible to avoid a significant burden of trial and error. To a screen angle can be approximated an angular change caused responsive to the peak shift as viewing the peak from the image projecting section. This is because the present inventor has theoretically analyzed and found a fact that, in case the characteristic of an image projecting section is approximated to a spot light source, the change amount responsive to a peak shift amount of angle where the peak is viewed from the image projecting section is approximated to the inclination angle of the screen.

It is preferable that the correcting-image supply section modifies the correcting image, according to an image lightness distribution generated depending upon the imaged information and an ideal lightness distribution, in a manner approximating an imaged-lightness distribution to the ideal lightness distribution, the ideal lightness distribution being set up in advance in accordance with at least one of characteristics of the image projecting section and image-information generating section.

By thus previously providing an ideal lightness distribution, the change amount responsive to a peak shift amount of angle as the peak is viewed from the image projecting section can be approximated to the inclination angle of the screen by approximating the image lightness distribution to the ideal lightness distribution.

Here, the "characteristic of the imaged information generating section" includes an imaging system characteristic, such as decrease in peripheral light, and a processing characteristic in an electronic circuit. The "characteristic of the image projecting section" includes a projection system characteristic and a processing characteristic in an electronic circuit. The electronic circuit characteristic includes, say, a characteristic in compensation for the amount of peripheral light of the image section and a characteristic of the liquid-crystal panel of the image projecting section.

It is preferable that the correcting-image supply section modifies the correcting image, according to an imaged-lightness distribution generated based on the imaged information and an ideal lightness distribution, it, a manner approximating the imaged-lightness distribution to the ideal lightness distribution rather than a lightness distribution upon-spot-light-source, the lightness distribution upon-spot-light-source being a lightness distribution configured, provided that a lightness on an optical axis of the image projecting section is Br, to have a lightness of Br×cos³ θ at a point angle θ from the optical axis, the ideal lightness distribution being a lightness distribution configured to have a lightness of Br×cos³·⁷⁵ θ.

With this arrangement, an ideal lightness distribution can be prepared simply and uniformly. This method has been realized based on the following two noticeable points newly found by the inventor. Firstly, the characteristic of the image projecting section and imaged-information generating section mainly relies upon the characteristic of such an optical system as an imaging system or projection system. Secondly, the characteristics of the optical system, such as the a projecting system or imaging system, are approximated as long as used in the same application of a projector and trapezoidal-correction image section.

Here, the "luminance distribution upon spot light source" is an imaged-lightness distribution assumed in the case of not considering the characteristics of the image projecting section and imaging system. Meanwhile, the "ideal lightness distribution" is an imaged-lightness distribution assumed in the case of considering the characteristics of the image projecting section and imaging system.

It is preferable that the correcting-image supply section has a process mode to repeat the modification until the imaged lightness distribution and the ideal lightness distribution reach a predetermined criterion of agreement in form.

This can enhance the robustness in the processing to approximate the imaged-lightness distribution to the ideal lightness distribution. This is because of a confirmation, based on a correcting image actually modified, of a fact the conformity in form reached a predetermined criterion.

It is preferable that the image processing section has an angle-of-peak determining section that determines an angle-of-peak, as viewed from the image projecting section, as to a peak in lightness on the real projection plane, according to the imaged information using the correcting image, an inclination-angle estimating section that estimates an angle of inclination according to an amount of an angle-of-peak shift as a shift in angle of from a reference angle-of-peak to the determined angle-of-peak, as viewed from the image projection section, in lightness on the virtual projection plane, and an image distorting section that previously distorts the input image in a manner compensating for a distortion of the output image according to the estimated angle of inclination.

Note that the invention can be realized in various forms including a projector and projector control device, a computer program and firmware for realizing a method thereof or device function on the computer, a storage medium recording such a computer program, a data signal including such a computer program and embodied in a carrier wave, and consumable container having a storage device.

BRIEF DESCRIPTION OF THE DRAWINGS

The invention will be described with reference to the accompanying drawings, wherein like numbers reference like elements.

DETAILED DESCRIPTION OF EMBODIMENTS

The present invention will now be described by way of embodiments, in the following order:

A. Projector Basic Construction and Screen Angle Estimation Principle,
B. Correcting-image Generation Process in First Embodiment of the Invention,
C. Trapezoidal-distortion Correction Process in First Embodiment of the invention,
D. Correcting-image Generation Process in Second Embodiment of the Invention, and
E. Modifications.

A. Projector Basic Construction and Screen Angle Estimation Principle

Figure 1:
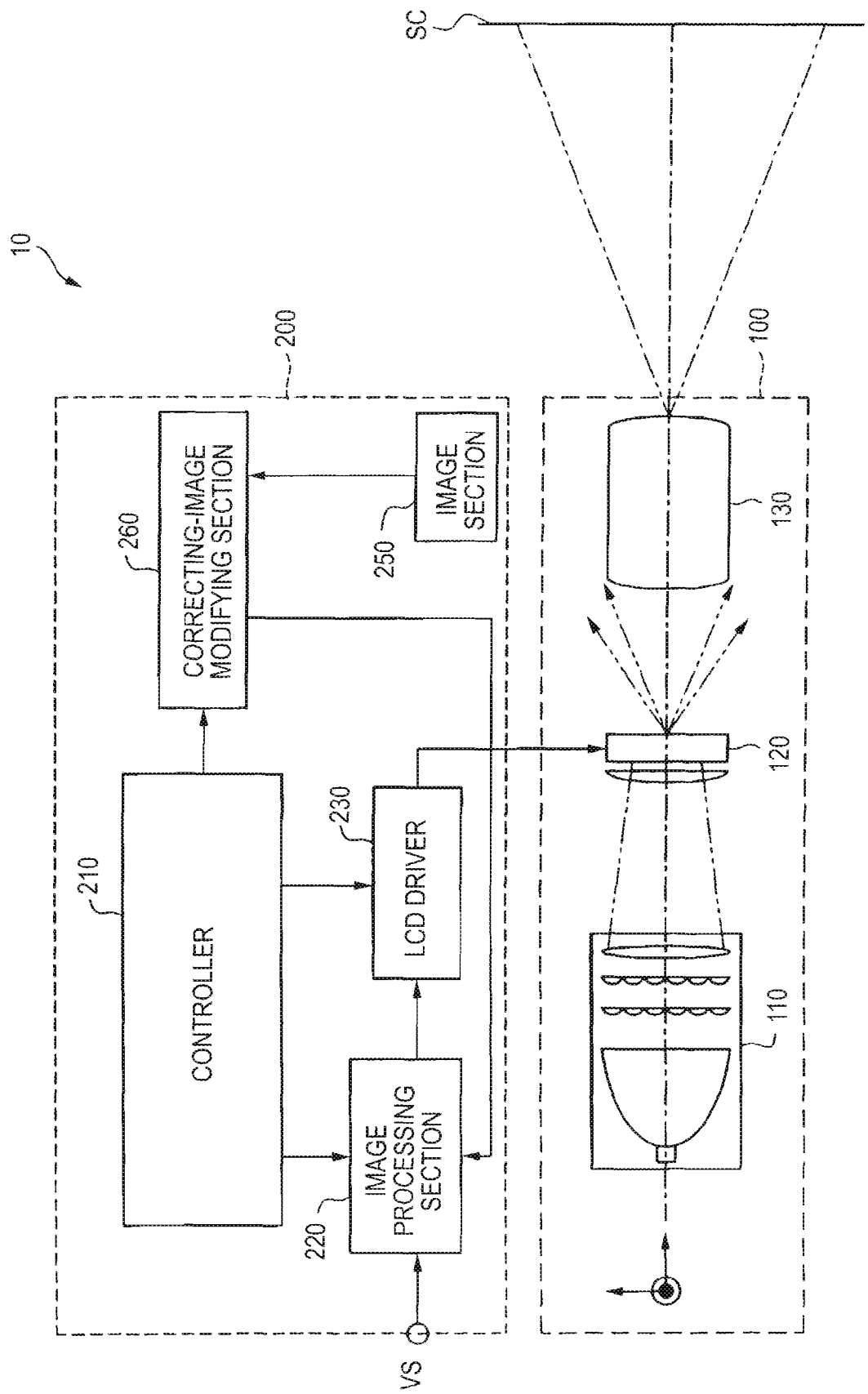
FIG. 1 is a block diagram showing a structure of a liquid-crystal projector in an embodiment of the present invention.

FIG. 1 is a bock diagram showing a construction of a liquid-crystal projector 10 in an embodiment of the invention. The liquid-crystal projector 10 includes an optical system 100 that projects an image onto a screen SC and a control system 200 that controls projection light. The optical system 100 has an illumination system 110, a liquid-crystal panel (LCD) 120 and a projection system 130. The control system 200 has a controller 210, an image processing section 220, a liquid-crystal-panel (LCD) driver 230, a correcting-image modifying section 260 and an image section 250.

The controller 210 has a CPU and memory, not shown. The controller 210 takes control of the image processing section 220, the LCD driver 230 and the correcting-image modifying section 260.

The image processing section 220 is to process an external input image signal and generate an input signal to the LCD driver 230. The processing of the input image signal includes various processes of image-quality adjustment and trapezoidal correction. The processing of image-quality adjustment includes, say, brightness control and color-temperature correction. Trapezoidal correction is a process to correct the distortion of an image generated in the case the screen SC does not face toward the liquid-crystal projector 11 with respect to the optical axis of the optical system 100.

The LCD driver 230 is to generate a signal that drives the liquid-crystal panel 120, depending upon the image data inputted from the image processing section 220. The drive signal is supplied to the liquid-crystal panel 120 where it is used to control the transmission light through the pixels included in the liquid-crystal panel 120. The light having transmitted the liquid-crystal panel 120 is illuminated to the projection system 130.

The projection system 130 is to project, to the screen SC, the light illuminated from the liquid-crystal panel 120. The state of light illumination to the screen SC is taken an image of by the image section 250. In this embodiment, the optical system 100, the LCD driver 230 and the image processing section 220 correspond to the "image projecting section" in the claims.

Figure 2:
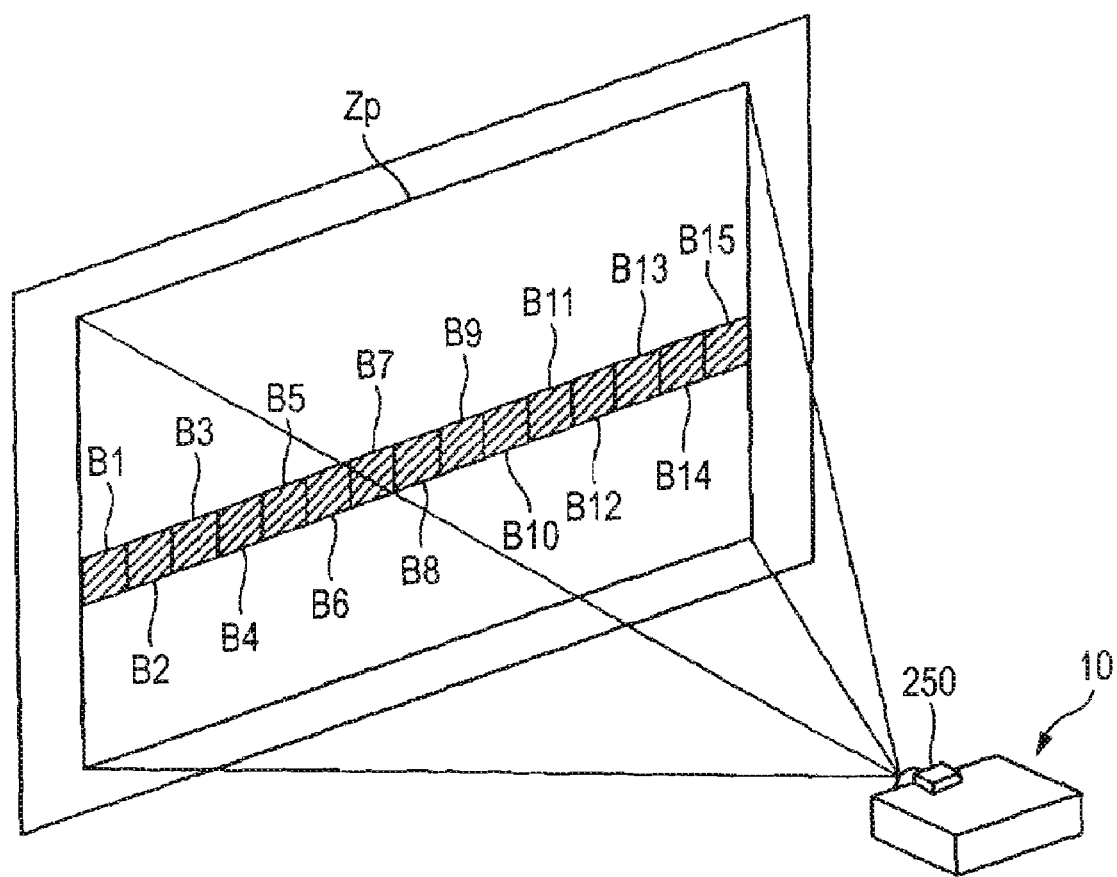
FIG. 2 is an explanatory view showing the imaging state of an image section in an embodiment of the invention.

FIG. 2 is an explanatory view showing the state of imaging by means of the image section 250 in the embodiment of the invention. The image section 250 is arranged close to the projection system 130 of the liquid-crystal projector 10, to have an optical axis parallel with the projection system 130. The image section 250 has a viewing angle involving the illumination range Zp of the projection system 130.

In this embodiment, the image section 250 has an observation area shown by hatching. The observation area is set up nearly in the same height as the projection system 130. The observation area is constituted by fifteen pixel blocks B1-B15 segmented in the horizontal direction. In this embodiment, lightness is observed discretely in the area. Incidentally, how to observe is described in detail later.

Figure 3A:
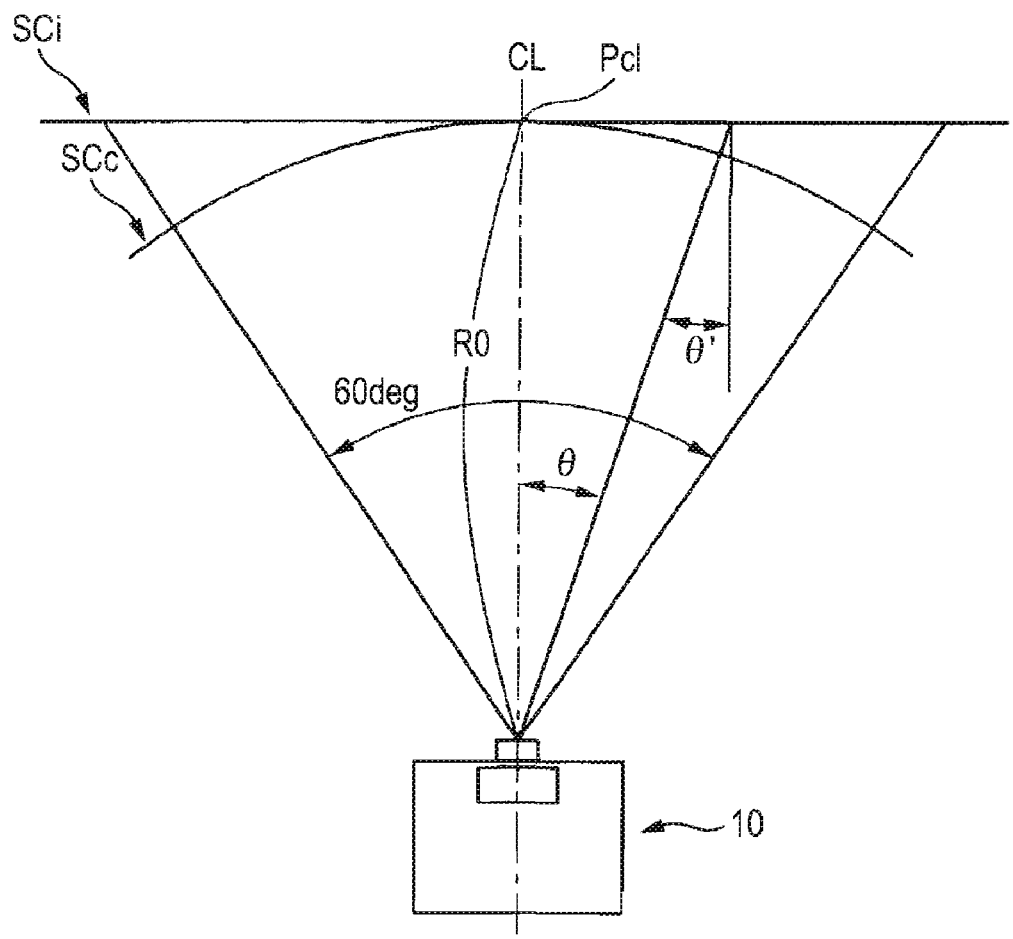
FIGS. 3A and 3B are explanatory figures showing the state of projection to a virtual projection surface when the liquid-crystal projector is assumed as a spot light source.
Figure 3B:
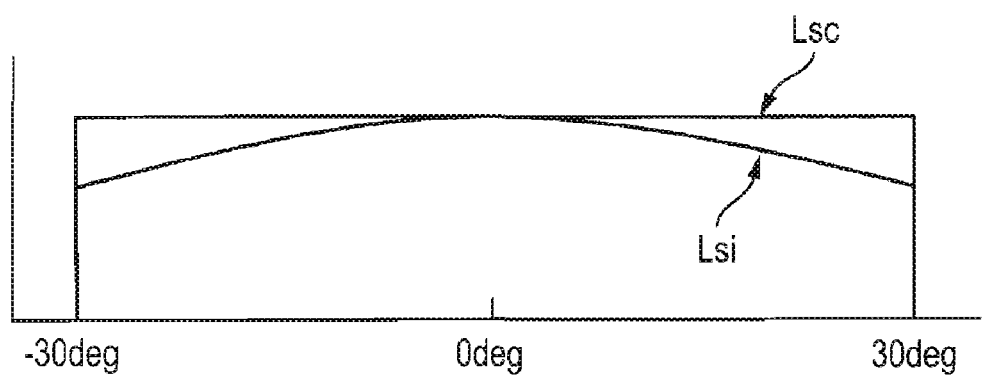

FIGS. 3A and 3B are explanatory figures showing the state of projection to a virtual projection plane in the case the liquid-crystal projector 10 is assumed a point light source. FIG. 3A is a view showing a positional relationship between the liquid-crystal projector 10, the virtual screen SCi and the cylindrical screen SCc, as viewed from above. The virtual screen SCi is a real screen SC arranged in the virtual projection plane, The cylindrical screen SCc has an axis given by a vertical line passing the point light source of the liquid-crystal projector 10. The projection planes of the virtual screen SCi and cylindrical screen SCc, in this embodiment, are both provided as perfect diffusive surfaces in order to exclude mirror-reflection light.

The liquid-crystal projector 10 has an illumination range of 60 degrees leftward and rightward. In this embodiment, the virtual screen SCi and the cylindrical screen SCc have projection planes that are regulated in position by the respective coordinates whose centers are given by the spot light source of the projection system 130.

FIG. 3B shows the illuminance in a position on the projection plane of the virtual screen SCi and cylindrical screen SCc. The distribution of illuminance Lsi represents an illuminance distributed over the virtual screen SCi. The distribution of illuminance Lsc represents an illuminance distributed over the cylindrical screen SCi. As can be seen from FIG. 3B, the illuminance distribution Lsc over the cylindrical screen SCc is flat in form whereas the illuminance distribution Lsi over the virtual screen SCi attains the maximum when the point observed is at a center Pc (at $\theta=0$) and decreases as the distance from the center PC1 (with an increase in $\theta$ absolute value) increases.

The reason of assuming such an illuminance distribution is that the illuminance over a perfect diffusive plane illuminated by a spot light source obeys Lambert's cosines law and cosine-squared law. The Lambert's cosines law is that the luminous flux, received by an point observed from a light-emitting point, is proportional to the cosine of the angle $\theta$ of between the normal line to the light-receiving surface (screen SCi, SCc) and the line connecting between the point observed and the light-emitting point. Meanwhile, the cosine-squared law is that the luminous flux, received by an point observed from a light-emitting point, is inversely proportional to the square of a distance of between the point observed and the light-emitting point.

As a result, the virtual screen SCi has an illuminance, at a point on its projection plane, of a value that the illuminance at an immediate front is multiplied by $\cos^3\theta \div R0^2 (=\cos\theta \div (R0 \div \cos\theta)^2)$. Meanwhile, the cylindrical screen SCc has a distance R0 staying constant and an angle $\theta$ assuming always zero because of a cylindrical screen having an axis given by a vertical line passing the spot light source of the liquid-crystal projector 10 as noted before. For this reason, the illuminance distribution is flat in form over the cylindrical screen SCc.

Figure 4A:
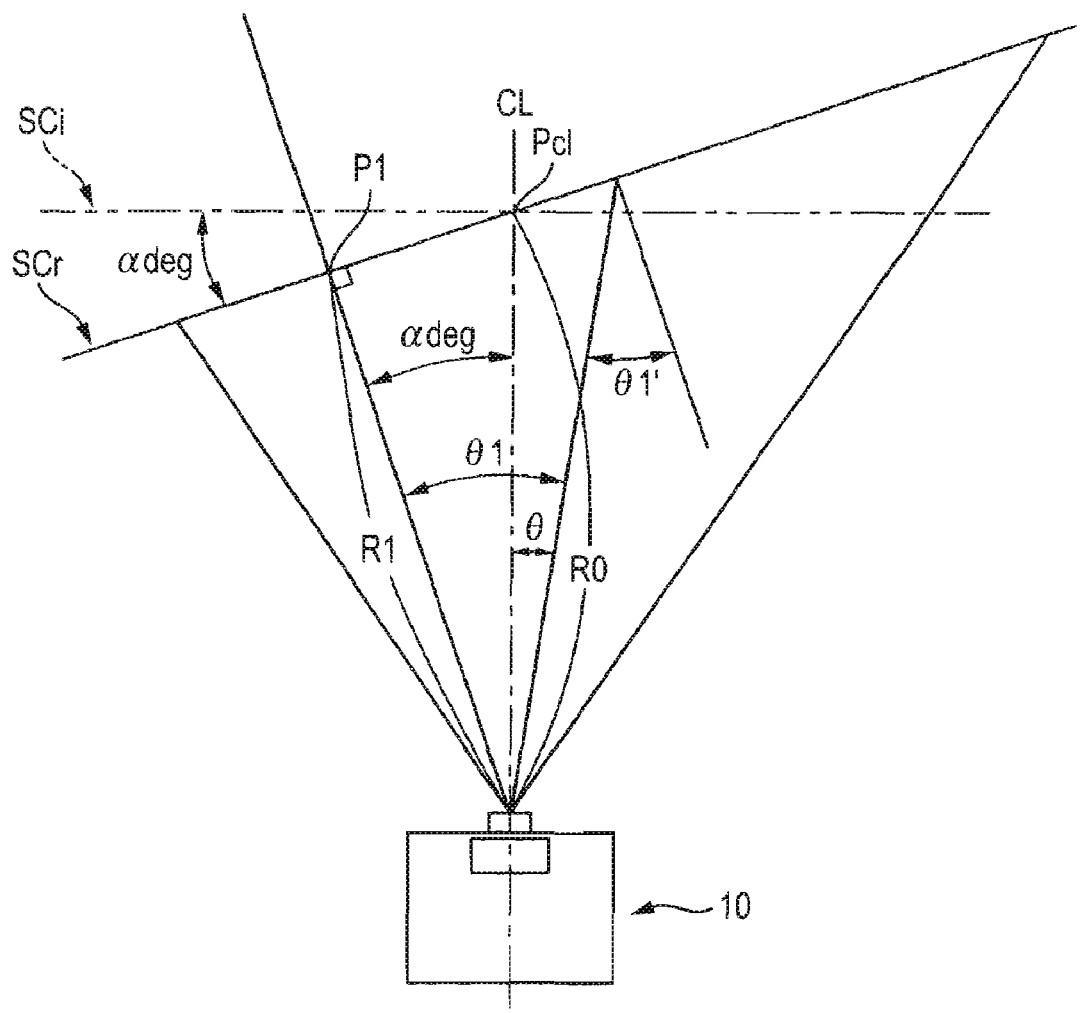
FIGS. 4A and 4B are explanatory figures showing the state of projection to a real screen inclining an angle α relative to the optical axis of the projection system.
Figure 4B:
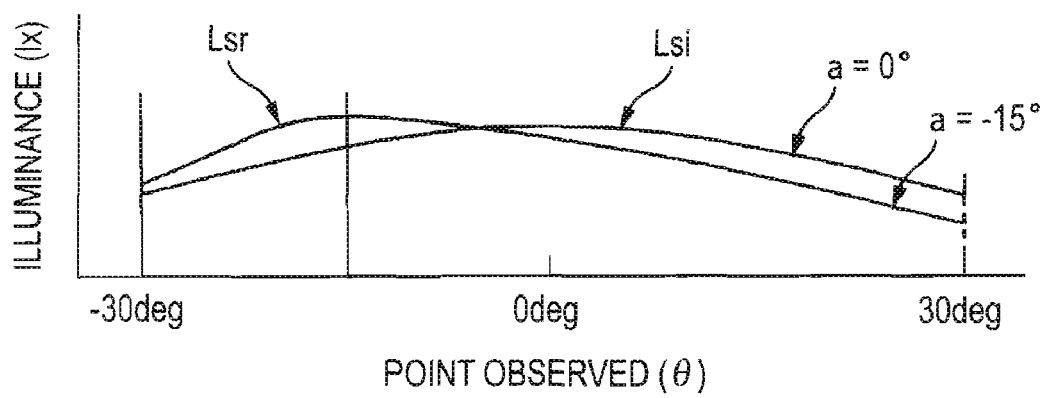

FIGS. 4A and 4B are explanatory figures showing a projection state to a real screen SCr inclining at an angle ca to the optical axis of the projection system 130. FIG. 4A is a view showing a relative position of the liquid-crystal projector 10 and a real screen SCr inclining at $\alpha$ degree, as viewed from above. FIG. 4B shows comparison between an illuminance distribution Lsi over the virtual screen SCi and an illuminance distribution Lsr over the real screen SCr. The illuminance distribution Lsi is the same as the FIG. 3B illuminance distribution Lsi.

The illuminance distribution Lsr has the maximum illuminance at a point P1 at which the spot light source of the liquid-crystal projector 10 is immediately in front of the real screen SCr, and the illuminance decreases as the distance from the point P1 increases. This is because, according to Lambert's cosines law and cosine-squared law, the illuminance attains the maximum at front point P1 of the spot light source and decreases as the distance from the point P1 increases.

In this manner, it can be seen that, where the light source is a spot light source, the illuminance is always the maximum at immediate front point of the light source due to Lambert's cosines and cosine-squared laws. This indicates that, when the liquid-crystal projector 10 illuminates light as a spot light source, the deviation of between the optical axis of the liquid-crystal projector 10 and the maximum illuminance point always matches with the inclination angle of the real screen SCr.

Noticing this point of view, the present inventor has created a unique method that by functioning as a spot light source the liquid-crystal projector 10 having a projection system for projecting of the liquid-crystal panel (LCD) 120 onto the screen SC, an inclination angle of the actual screen SCr is estimated. This is because the present inventor has found a fact that, by functioning the liquid-crystal projector 10 as a spot light source, the deviation between the optical axis of the liquid-crystal projector 10 and the maximum illuminance point matches with the inclination angle of the real screen SCr, thus making it possible to estimate an inclination angle of the real screen SCr with accuracy.

B. Correcting Image Generation Process in First Embodiment of the Invention

Figure 5:
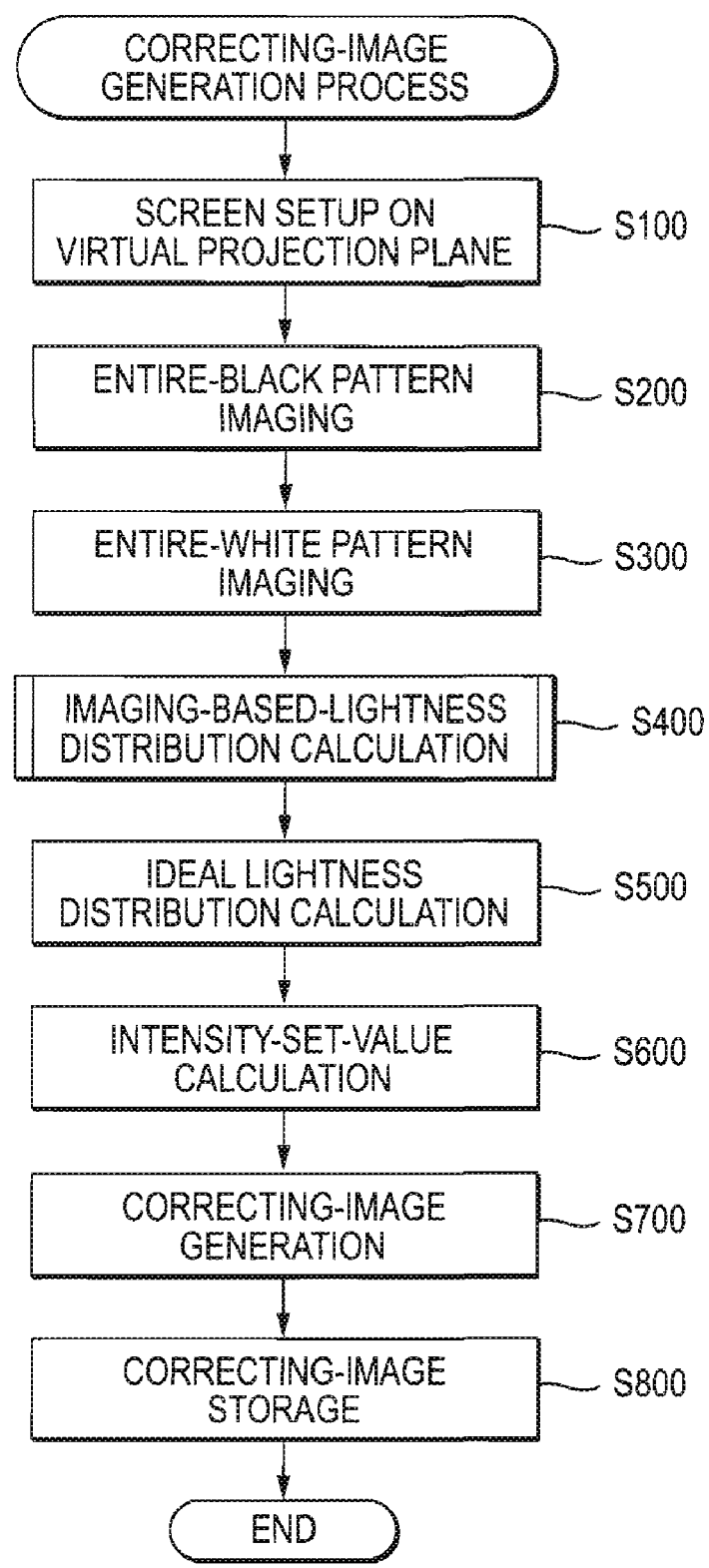
FIG. 5 is an explanatory figure showing a content of a correcting-image generation process in a first embodiment of the invention.

FIG. 5 is an explanatory view showing a content of the correcting-image generation process in the first embodiment of the invention. The embodiment of the invention is arranged to generate a correcting image for functioning the liquid-crystal projector 10 as a spot light source 10 and estimate an inclination angle of the real screen SCr by use of the correcting image. In the embodiment, the key lies in how to generate a correcting image for functioning the liquid-crystal projector 10 as a spot light source.

At step S100, a user sets up a screen Sc, a real projection plane, on a virtual projection plane. The setup on the virtual projection plane is done by aligning, say, a screen Sc center with the optical axis of the liquid-crystal projector 10 and adjusting the optical system 100 of the liquid-crystal projector 10 for focusing.

At step S200, the liquid-crystal projector 10 projects an entire-black pattern image to the screen Sc and performs an imaging by use of the image section 250. The reason of imaging the entire-black pattern image is to determine a difference from an entire-white image and thereby suppress the affection of environmental light. The entire-black pattern image is configured to minimize the transmission light through the liquid-crystal panel 120.

At step S300, the liquid-crystal projector 10 projects an entire-white pattern image to the screen SC and takes an image by use of the image section 250. The reason of taking the solid-while pattern image, in this embodiment, is to generate a correcting image with reference to (or taking as an initial state) the entire-white pattern image. The entire-white pattern is an image configured to maximize the transmission light through the liquid-crystal panel 120. Note that the correcting image may be generated with reference to image pattern often than the entire-white pattern image, as described later.

At step S400, the liquid-crystal projector 10 performs an imaged-lightness distribution calculation process. The imaged-lightness distribution calculation process is to calculate a lightness distribution converted into a pixel value by taking an image of a lightness distribution on the screen Sc.

Figure 6:
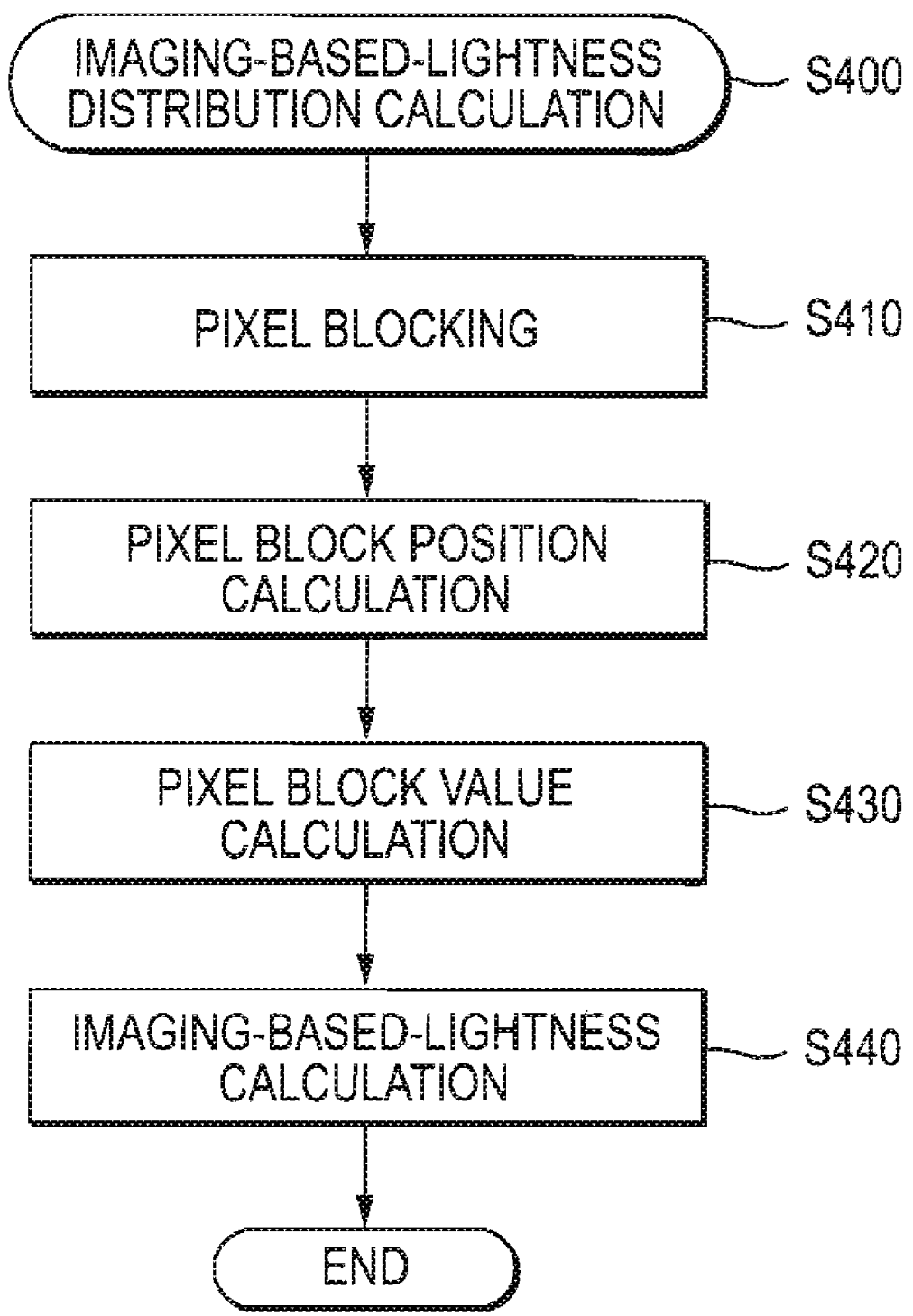
FIG. 6 is an explanatory figure showing a content of an imaging-intensity distribution calculation process in the first embodiment of the invention.

FIG. 6 is an explanatory view showing a content of the imaged-lightness distribution calculation process in the first embodiment of the invention. At step S410, the liquid-crystal projector 10 performs a pixel-blocking process. The pixel-blocking process is to convert pixel data into pixel-block B1-B15 based data so that the image data acquired by the image section 250 can be handled based on each of the pixel blocks B1-B15 (FIG. 2). Each of the pixel blocks B1-B15 is a set of a plurality of pixels.

The reason of performing the pixel-blocking process is to suppress the effect of local noise to be readily undergone by pixel-based lightness. The pixel-blocking process also has an advantage to relieve the subsequent process burden because data can be reduced in the number.

At step S420, the liquid-crystal projector 10 calculates a pixel block position. The pixel block position is calculated by calculating a center line segment of a pixel block and determining a center coordinate depending upon a calculated center line segment.

At step S430, the liquid-crystal projector 10 calculates a pixel block value. The pixel block value can be calculated, say, by calculating a mean of the pixel values included in the pixel block. The pixel block value is calculated depending upon an entire-white value obtained upon projecting an entire-white pattern to the screen SC and an entire-black value obtained upon projecting an entire-black pattern to the screen SC. The pixel block value, in this embodiment, is calculated by subtracting the entire-black block value from the entire-white block value. The reason of subtracting an entire-black block value is to suppress the effect of environmental light.

At step S440, the liquid-crystal projector 10 calculates an imaged-lightness distribution by use of a pixel block position and pixel-block value. The imaged-lightness distribution, in this embodiment, is normalized from 1 to 0 by use of the maximum pixel block value and the entire-black minimum value in order to make explanation easy to understand.

Figure 7:
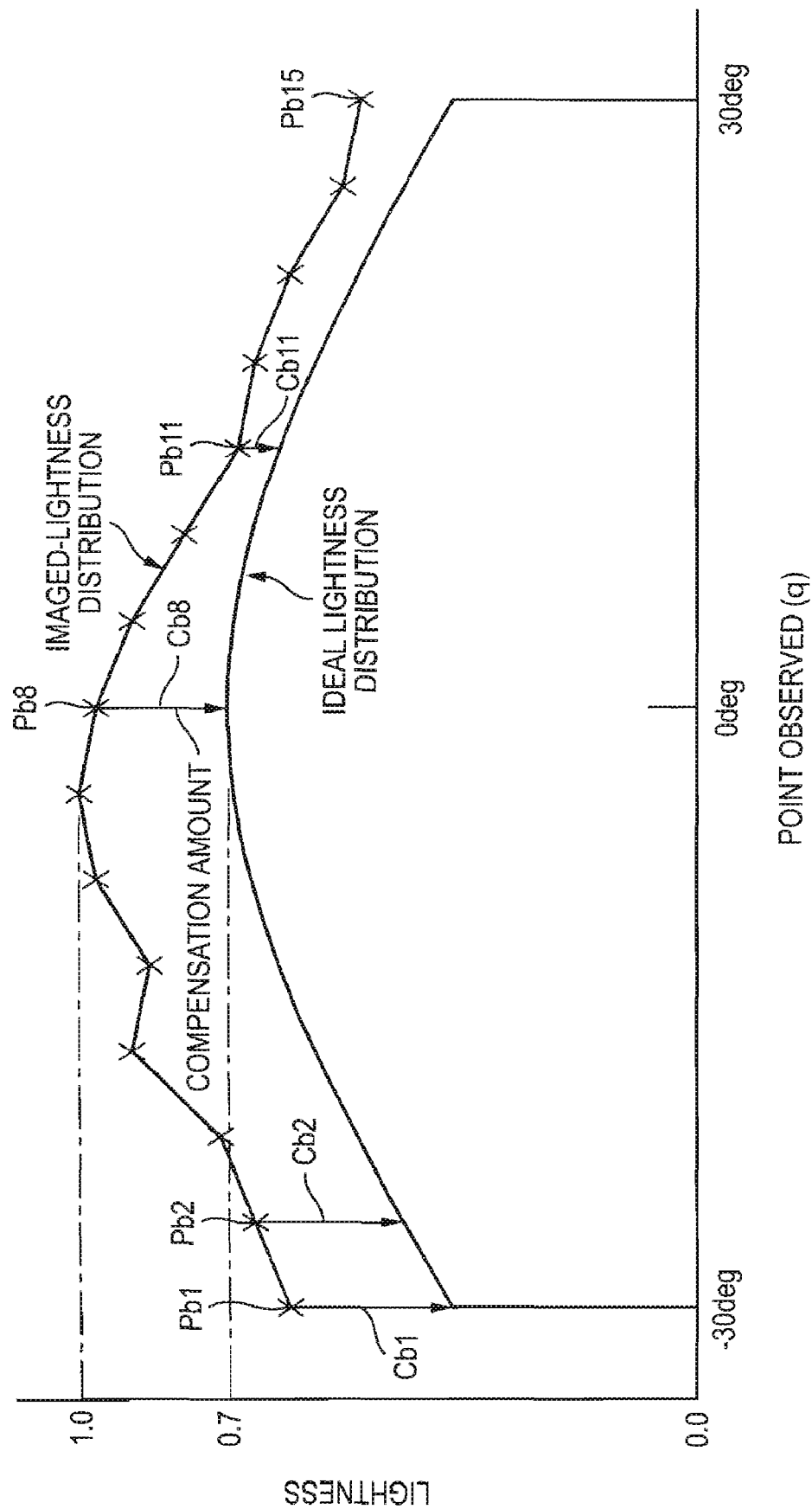
FIG. 7 is an explanatory figure showing a content of a compensation-amount calculation process in the first embodiment of the invention.

FIG. 7 is an explanatory figure showing a content of the compensation-amount calculation process in the first embodiment of the invention. This figure shows normalized pixel values Pb1-Pb15 of the respective pixel blocks, an ideal lightness distribution and compensation amounts Cb1-Cb15 for approximating the pixel values Pb1-Pb15 to the ideal lightness distribution. The ideal lightness distribution is normalized such that the compensation amounts Cb1-Cb15 are all given positive, though the detail is referred later. Note that the pixel values Pb1-Pb15 and compensation amounts Cb1-Cb15 are partly omitted in order not to complicate the figure.

At step S500, the liquid-crystal projector 10 calculates an ideal lightness distribution. The ideal lightness distribution is a lightness distribution to be observed by the image section 250 in the case the liquid-crystal projector 10 is assumed functioning as a spot light source. Accordingly, in case there is an agreement in distribution form between the pixel values Pb1-Pb15 and the ideal lightness, the optical system 100 is meant to function as a spot light source. The compensation values Cb1-Cb15 are to approximate the distribution form of pixel values Pb1-Pb15 to the ideal lightness distribution form. The compensation is performed by adjusting the transmission light through the liquid-crystal panel 120.

The ideal lightness distribution, in this embodiment, is a lightness distribution of a pixel value into which the image section 250 converts an ideal on-screen illuminance distribution caused on the assumption the liquid-crystal projector 10 functions as a spot light source. Namely, the ideal lightness distribution, in this embodiment, is a distribution that the characteristic as an imaging optical system provided by the image section 250 is added to the ideal on-screen illuminance distribution.

Figure 8:
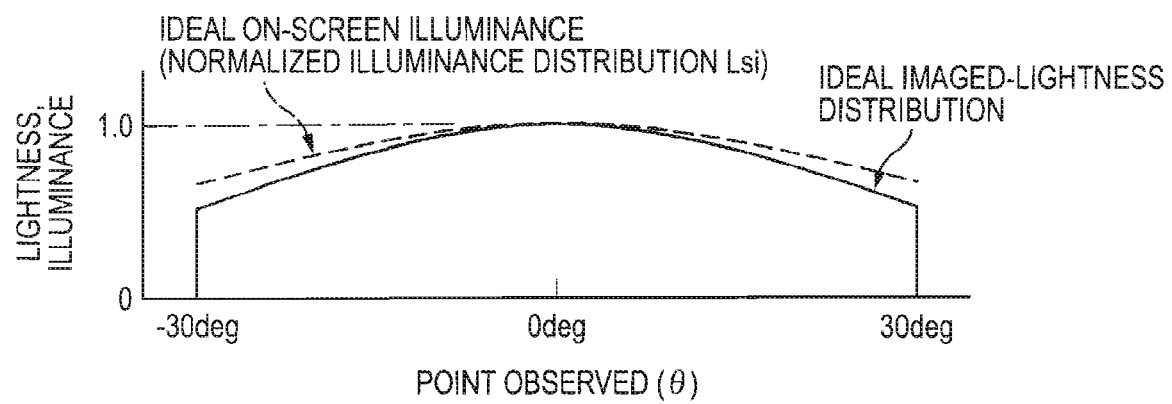
FIG. 8 is an explanatory figure showing a relationship between an ideal on-screen illuminance distribution and an ideal imaged-lightness distribution in the first embodiment of the invention.

FIG. 8 is an explanatory figure showing a relationship between an ideal on-screen illuminance distribution and an ideal imaged-lightness distribution in the first embodiment. The ideal on-screen illuminance distribution is of normalized values of an illuminance distribution Lsi in the case light is illuminated to the virtual screen SCi bay means of the spot light source. The ideal imaged-lightness distribution is of normalized values of a lightness distribution in the case an illuminance distribution Lsi is imaged by the image section 250 and converted into pixel values. Those values are normalized from 1 to 0 by use of the maximum values thereof in order to make easy to understand the relationship between the both.

In this embodiment, the ideal lightness distribution is configured to have a lightness of $Br \times \cos^{3.75} \theta$ in a point angle $\theta$ from the optical axis provided that the image projecting section has a lightness of Br on the optical axis of the image projecting section. By doing so, an ideal lightness distribution can be prepared simply and uniformly.

The configuration method of an ideal lightness distribution has been realized by the following two noticeable points found out by the present inventor. Firstly, the imaged-information generating section has a characteristic relying mainly upon the characteristic of an imaging optical system, and secondly the imaging optical system has a characteristic to approximate as long as used for the same purpose of trapezoidal-correcting image section.

The disagreement in the form between the ideal imaged-lightness distribution and the ideal on-screen illuminance distribution, is caused by the lower of the surrounding light in the image section 250. However, concerning the ideal imaged-lightness distribution and ideal on-screen illuminance distribution, it is known that the values of lightness and illuminance at a point on the screen are mutually in a linear relationship provided that the screen SC is set up on a virtual projection plane, Noticing the relationship, it can be seen that in case the ideal imaged-lightness distribution and the imaged-lightness distribution are placed into coincidence on the assumption the screen SC is set up on the virtual projection plane, the ideal on-screen illuminance distribution and the on-screen illuminance distribution can be placed into coincidence with each other. Incidentally, in this embodiment, the lightness distribution, obtained upon acquiring an ideal on-screen illuminance distribution by the image section free from a lower of surrounding light, corresponds to the "lightness distribution under a spot light source" in the claim.

In this manner, it can be seen that, when the screen SC is set up on a virtual projection plane, by regulating the transmission light through the liquid-crystal panel 120 in a manner bringing the imaged-lightness distribution close to the ideal imaged-lightness distribution, the projection characteristic of the optical system 100 can be approximated to that of a spot light source in a pseudo fashion.

The ideal lightness distribution can be regulated by re-normalizing the ideal imaged-lightness distribution in a manner making all the compensation amounts Cb1-Cb15 positive. In this embodiment, re-normalization is done from 0.7 to 0 by use of the maximum value of the ideal imaged-lightness distribution. Due to this, the smallest compensation amount Cb10 (FIG. 9) is positive. In this manner, the reason of performing a normalization to make all the compensation values Cb1-Cb15 positive is to consider that the transmission light through the liquid-crystal panel 120 can be decreased but cannot be increased upon regulation, i.e. uni-directionality.

At step S600 (FIG. 5), the liquid-crystal projector 10 performs an intensity-set-value calculating process. The intensity-set-value calculating process is a process to calculate an intensity-set-value for regulating the transmission light through the liquid-crystal panel 120 such that the projection characteristic of the optical system 100 is approximated to that of a spot light source in a pseudo fashion.

The intensity-set-value, when intensity includes 256 levels of 0-256, can be calculated by use of the following calculation equation.

Calculating equation: setting intensity

=255−(1−compensation amount)×255÷γ-value where the γ-value is a coefficient of a gamma curve representing a relationship of between an intensity-set-value and a brightness of a not-shown lamp included in the optical system 100.

At step S700 (FIG. 5), the liquid-crystal projector 10 performs a correcting-image generation process. The correction-image generation process is to generate correcting-image data by using an intensity-set-value calculated. Specifically, correcting-image data is generated by making the pixels belonging to the pixel block B1-B15 to an intensity-set-value.

Although the pixel blocks are fifteen in the number for the sake of easier understanding the explanation, the increased number of blocks allows for regulation with greater preciseness. However, the increased number of blocks requires the heavier burden on computation process, thus resulting in a trade-off problem of measurement accuracy and process burden. However, the present inventor has found that, for projector trapezoidal correction, mounting those nearly 80 in the number provides saturation in performance.

At step S800, the liquid-crystal projector 10 stores the correcting-image generation process. In the correcting-image generation process, storage is made to a not-shown non-volatile memory included in the correcting-image modifying section 260. This makes it possible to maintain the state of storing the correcting-image generation process even if the power is turned off. Accordingly, the effect of the invention can be obtained even by effecting once a correcting-image generation process, say, in a function confirming test or the like in a production process.

C. Trapezoidal-Distortion Correction in First Embodiment of the Invention

Figure 9:
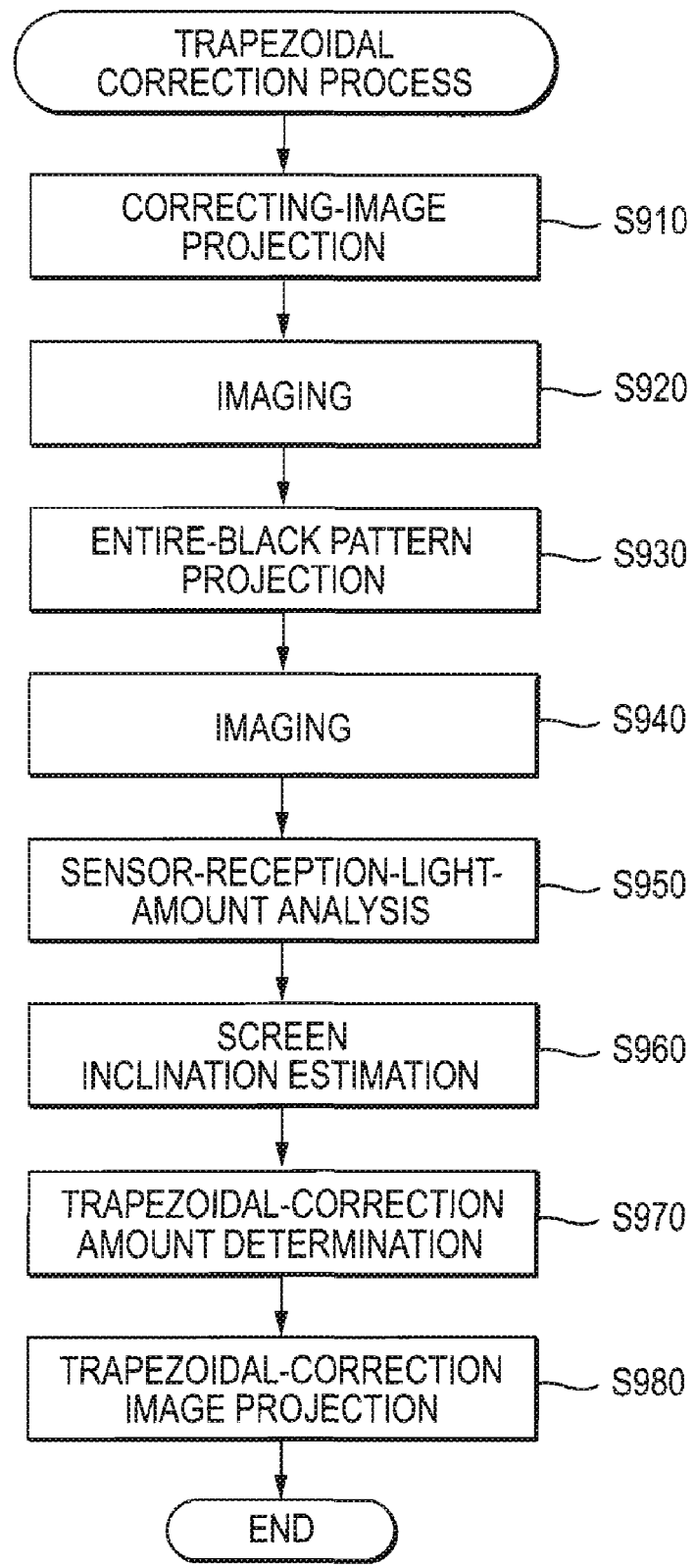
FIG. 9 is a flowchart showing a trapezoidal-distortion correcting routine in the embodiment of the invention.

FIG. 9 is a flowchart showing a trapezoidal-distortion correcting routine in this embodiment of the invention. This embodiment is assumed that there is no vertical inclination in order to make explanation easy to understand. For this reason, in the trapezoidal-distortion correcting process in this embodiment of the invention, measurement is only made as to a lateral inclination of the screen.

At step S910, the liquid-crystal projector 10 projects a correcting image to the screen SC. The correcting image, generated in the foregoing method, is configured to approximate the projection characteristic of the optical system 100 to a spot light source in a pseudo fashion.

At step S920, the image section 250 (FIGS. 1, 2) performs an imaging process. The imaging process is to measure a light amount of from a predetermined portion of the region where the correcting image is projected. The predetermined region in this embodiment is shown by hatching in FIG. 2. Incidentally, the light amount measured corresponds to "lightness information" in the claim.

At step S930, the liquid-crystal projector 10 projects an entire-black pattern to the screen SC. The entire-black pattern image is configured to minimize the transmission light through the liquid-crystal panel 120.

At step S940, the image section 250 performs an imaging process. The reason of imaging an entire-black pattern is to determine a difference of from the correcting image and suppress the effect of environmental light.

At step S950, the correcting-image modifying section 260 performs a sensor-reception-light analysis process. The sensor-reception-light analysis process is to acquire a reception-light difference by projecting the correcting image and entire-black patterns image at an interval of instantaneous visual field of the sensor and to make a mapping thereof to an angular coordinate system taken with reference to a principal point at the optical center of the projection system 130.

At step S960, the correcting-image modifying section 260 estimates an inclination of the screen SC. The inclination of the screen SC matches with the angle of a peak of reception light relative to the optical axis of the projection system 130.

Figure 10A:
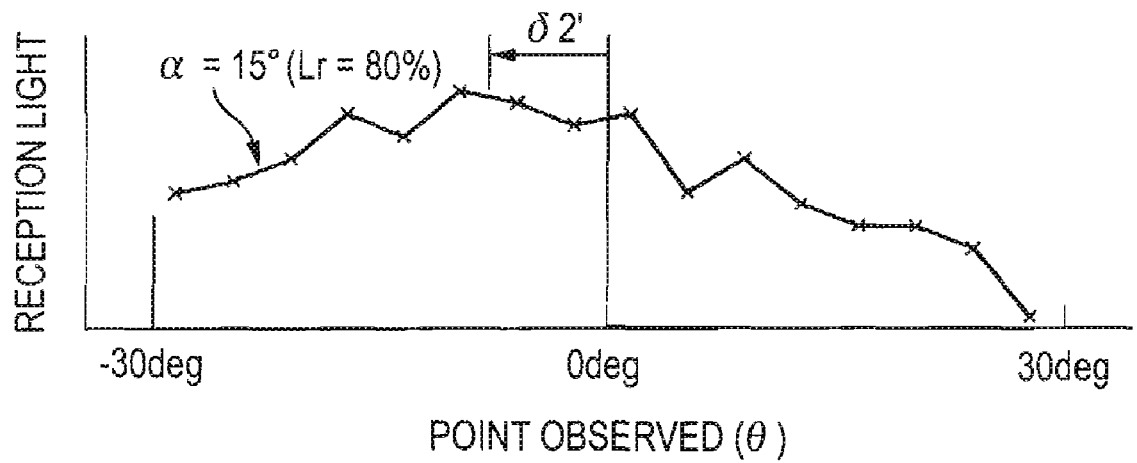
FIGS. 10A and 10B are explanatory figures showing manners of determining a peak point in the embodiment of the invention.
Figure 10B:
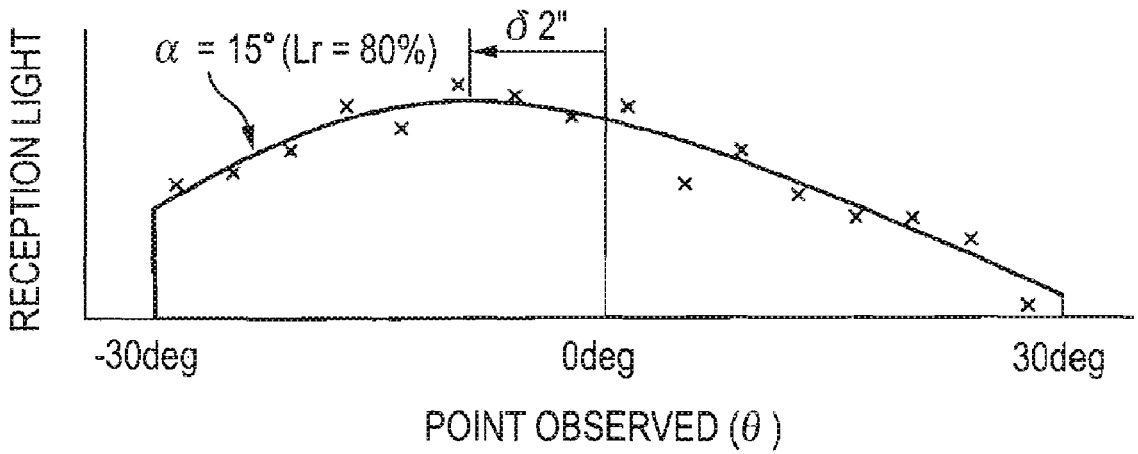

The peak may be determined (δ2') by a simple comparison and complement of the reception light mapped on the angular coordinate system as shown, say, in FIG. 10A, or determined (δ2') by a curve-fitting with use of the least-squares method as shown, say, in FIG. 10B. The former is advantageous in that algorithm is simple to simplify the calculation process whereas the latter is advantageous in that errors due to reception-light measurement noise are reduced upon estimating the screen SC angle. The curve fitting also has the effect that noise, even if greatly induced at around the peak, can be reduced in its affection.

The screen SC inclination thus estimated is forwarded from the correcting-image modifying section 260 (FIG. 1) to the image processing section 220.

At step S970, the image processing section 220 determines the amount of trapezoidal-correction. Trapezoidal correction is a process that the image to be projected is previously distorted reverse in a manner to reduce the image distortion caused by the screen SC inclination (i.e. in a manner being compensated for). The amount of trapezoidal correction signifies a quantity of reverse distortion.

Figure 11:
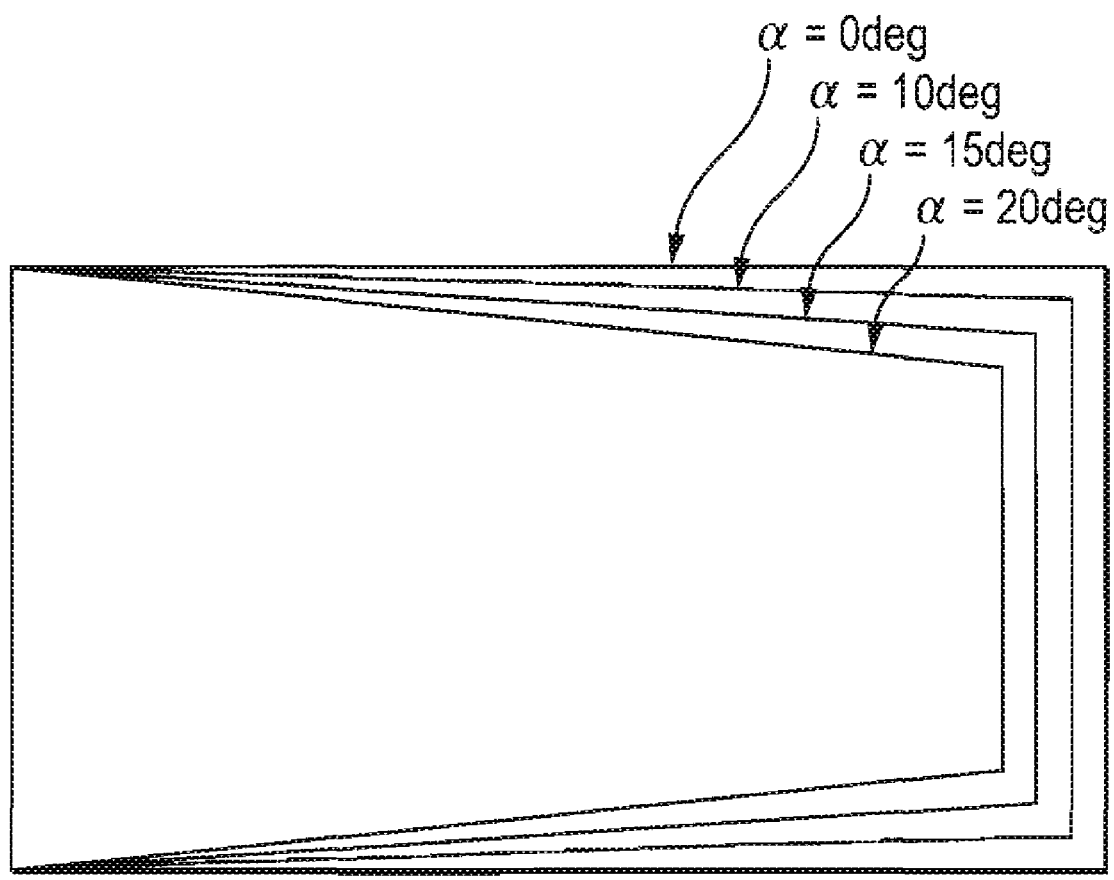
FIG. 11 is an explanatory figure showing a relationship between a screen inclination and a trapezoidal-correction amount in the embodiment of the invention.

FIG. 11 is an explanatory view showing a relationship between a screen SC inclination and a trapezoidal correction in the embodiment of the invention. As can be seen from FIG. 11, correction amount increases as the screen SC inclines greater. The reason of increasing the correction amount with increasing screen SC inclination is that the distance, of from the principal point of the projection system 130 to the screen SC projection plane, becomes different greater at left and right as the inclination of the screen SC increases.

At step S980, the liquid-crystal projector 10 makes a projection of an image trapezoidal-corrected. The trapezoidal-corrected image is projected after previously distorting a projecting image by the image processing section 220 in a determined amount of trapezoidal correction.

In this manner, this embodiment measures an angular deviation by use of a correcting image configured such that the shift in the peak of lightness matches with the angular deviation of between the virtual and real projection planes. Based on a shift amount of peak, angular deviation can be measured in a direct way.

D. Correcting Image Generation Process in Second Embodiment of the Invention

Figure 12:
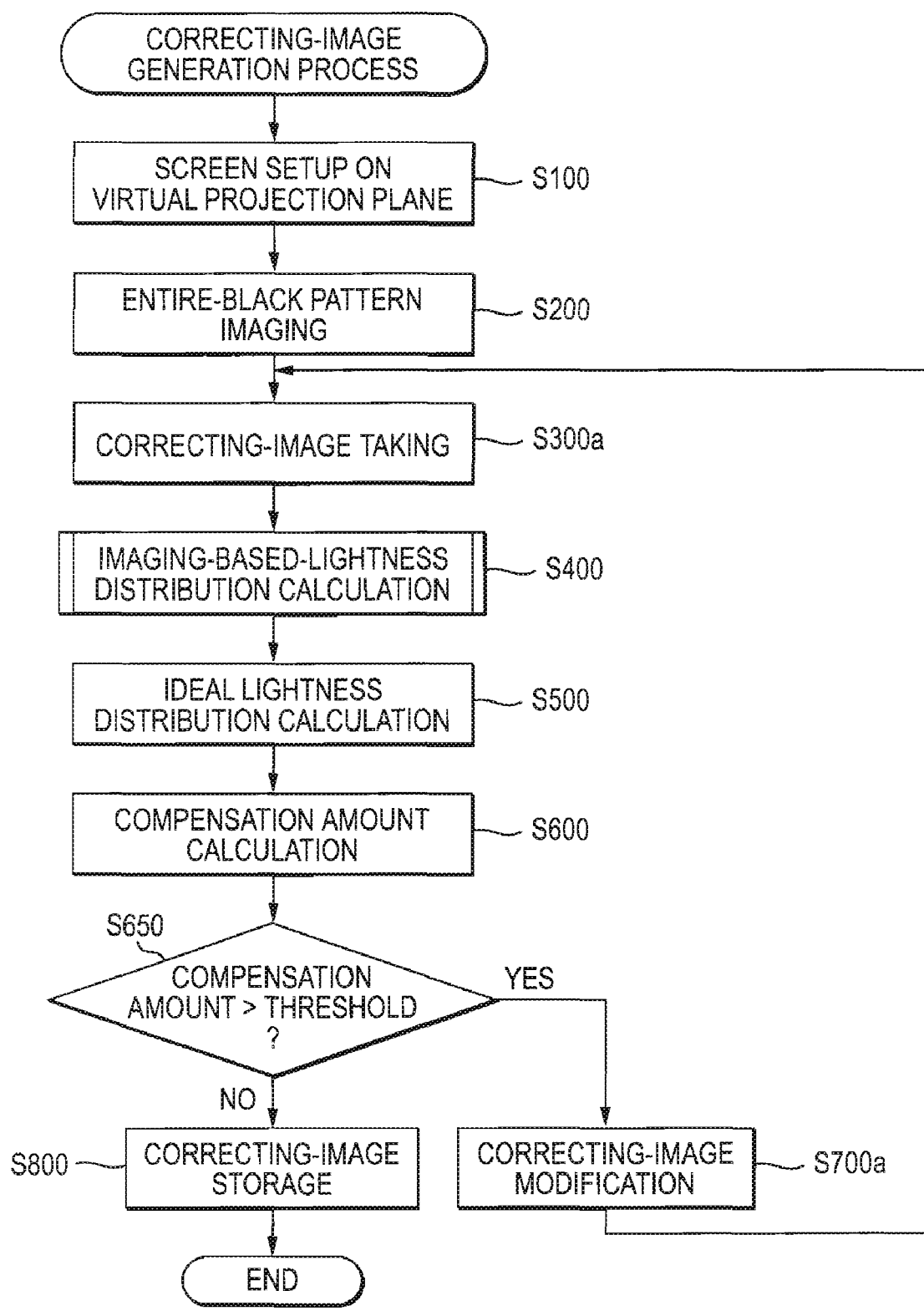
FIG. 12 is an explanatory figure showing a content of a correcting-image generation process in a second embodiment of the invention.

FIG. 12 is an explanatory figure showing a content of a correcting-image generation process in a second embodiment of the invention. The correcting-image generation process in the second embodiment is different from the first-embodiment correcting-image generation process in that operation is repeated until the correcting image reaches a predetermined criterion while verifying a correcting image generated in a method similar to the first-embodiment correcting-image generation process.

This repetitive operation is realized by changing the entire-white-pattern imaging (step S300, FIG. 5) to a correcting-image taking (step S300a) and the correcting-image generation (step S700) to a correcting-image modification (step S700a) and a determination of whether or not the correcting image reached a predetermined criterion (step S650) (hereinafter, referred to as a correcting-image estimation process).

The correcting image taking (step S300a) is different from the first-embodiment entire-white pattern imaging (step S300) in that, in place of an entire-white pattern image, correcting-image data is projected to the screen SC. However, where correcting-image data is not stored in the not-shown memory, an entire-white pattern image is projected. Meanwhile, correcting-image modification process (step S700a) is different from the first-embodiment correcting-image generation (step S700) in that, in place of an entire-white pattern image, correcting-image data is used as a criterion.

The correcting-image evaluation (step S650) is to verify whether or not the form difference is sufficiently small between imaged ideal lightness distribution and an imaged lightness distribution based on a correcting image projected in the correcting-image taking (step S300a). The verification is made by a determination based on compensation amounts of the pixel blocks. The form difference between the both can be determined by whether or not the squared sum of compensation amount of the pixel block is smaller than a predetermined threshold.

In this manner, the process of from correcting-image taking (step S300a) to correcting-image modification (step S700a) is repeated until a difference between the both becomes sufficiently small (step S650).

In this manner, the second embodiment confirms a fact that the agreement in form reached a predetermined criterion, depending upon a correcting image actually modified. Thus, there is an advantage that robustness can be enhanced in the processing to approximate an imaged lightness distribution to an ideal lightness distribution.

E. Modifications

The invention is not limited to the foregoing embodiments but can be practiced in various forms within the scope not departing from the gist thereof. For example, the following modifications are feasible.

E-1. In the embodiments, the ideal lightness distribution was provided by a lightness distribution configured to have a lightness of $Br \times \cos^{3.75} \theta$ at a point angle $\theta$ from the optical axis provided that the lightness on the optical axis of the image projecting section is Br. However, the ideal lightness distribution may be configured by a lightness distribution acquired in the image section by actually illuminating light from a spot light source to a screen arranged on a virtual projection plane for example. Alternatively, the ideal lightness distribution may be calculated by an analysis based on the optical characteristic of the image section.

E-2. In the embodiments, the ideal lightness distribution was provided by considering the optical characteristic of the image section. However, the ideal lightness distribution may be established by considering also the characteristic of the image projecting section. The foregoing embodiments were structured to function the projection system as a spot light source in a pseudo fashion by use of a correcting image. This is because it also assumed that it cannot be functioned perfectly as a spot light source.

Incidentally, the image projecting section is similar to the image section in that its characteristic is mainly relies upon the characteristic of an optical system such as the projection system and in that the projection system is approximate in characteristic as long as used for the same purpose of a projector. Because this has been empirically confirmed by the present inventor, a uniform lightness distribution, e.g. lightness $Br \times \cos^{3.75} \theta$ can be established by considering also the characteristic of the image projecting section.

Meanwhile, the characteristic of the image section or image projecting section may include a characteristic of an electronic circuit besides an optical characteristic. The characteristic of an electronic circuit includes, say, a compensation characteristic for the peripheral light amount of the image section and a liquid-crystal panel characteristic in the image projecting section. Generally, the ideal lightness distribution, used in the invention, may be previously established in accordance with at least one of the characteristics of the image projecting section (including an electronic circuit) and imaged-information generating section (including an electronic circuit).

E-3. In the embodiments, correcting image was modified in a manner approximating the characteristic of the image projecting section to a spot light source. However, noticing the illuminance ratio or illuminance-distribution uniformity, the correcting image may be modified to approximate the amount of peak shift to the angular deviation by regulating those. Generally, the correcting image in the invention is satisfactorily modified in a manner approximating the change amount, in accordance with a peak shift amount at an angle viewing the peak from the image projecting section, to the screen inclination angle of from the virtual projection plane.

E-4. In the embodiments, trapezoidal correction was made laterally by estimating the horizontal inclination of the screen SC. It may be combined with a vertical trapezoidal correction.

A vertical angle may be estimated by a measurement by the liquid-crystal projector 10 with use of a sensor incorporated in a tilt mechanism that regulates the optical axis to the gravitational or vertical direction. Otherwise, measurement may be made in accordance with a vertical shift of lightness peak. Furthermore, vertical trapezoidal correction may be implemented singly similarly to the foregoing embodiment.

Incidentally, the "inclination of between virtual and real projection planes" in the claim signifies an inclination occurring in at least one of horizontal direction and vertical direction.

E-5. In the embodiment, the image projecting section was structured such that its optical axis faces toward and vertical to the lateral screen SC. However, it may be structured on the premise arranged obliquely to the same. The image projecting section, used in the invention, is satisfactorily structured to project an image to a virtual projection plane arranged in a predetermined positional relationship. The virtual projection plane is not required to be vertical to the optical axis of and facing toward the image projecting section.

E-6. In the embodiments, the effect of environmental light was suppressed by taking an image through projecting an entire-black pattern. However, projecting an entire-black pattern is not essential but can be omitted. Projecting an entire-black pattern is advantageous in respect of suppressing the effect of environment light and hence enhancing the accuracy of measurement.

E-7. The liquid-crystal projector or another type of projector is preferably possessing a calibration mode that is an operation mode to reconstruct a correcting image in accordance with imaged information in the state the real projection plane is arranged coincident with the virtual projection plane.

The calibration mode can be realized by providing input means (switch, interface screen) to notify the projector of a fact the real projection plane is in an arrangement coincident with the virtual projection plane. By doing so, it is possible to suppress the lower in measurement accuracy resulting from aging in the optical component such as the illumination system and the liquid-crystal panel (or DMD (registered trademark) panel).

E-8. In the embodiments, the invention was structured as the projector 10. Alternatively, it can be structured as a projector of another scheme, e.g. DLP (registered trademark) scheme or three-tube scheme. Furthermore, the invention, in the embodiment, was structured as a projector in a front scheme. Alternatively, application is possible to a projector in a rear scheme.

E-9. In the embodiments, An angle was employed as a variable representing a peak shift. For example, the pixel position of a not-shown sensor included in the image section may be used to determine the amount of trapezoidal correction. Generally, the image processing section of the invention is satisfactorily configured to previously distort an input image in a manner compensating for the distortion in an output image based on a peak shift.

Where the function of the invention is partly or entirely realized on software, the software (computer program) can be provided in a form stored on a computer-readable recording medium. In the invention, the "computer-readable recording medium" includes, variously in type, an in-computer storage device, such as a RAM and ROM, and an external storage device fixed to a computer, such as a hard disk, without limited to a portable recording medium such as a flexible disk and CD-ROM.

What is claimed is:

1. A projector, comprising:
    an image projecting section that projects an image, according to an input image, to a virtual projection plane arranged in a predetermined positional relationship therewith;
    an imaged-information generating section that includes an output-image taking section to take an output image projected to a real projection plane and output imaged information containing lightness information, the lightness information having a correlation to a lightness of an image taken; and
    a distortion correcting section that corrects a distortion, in an output image for the input image, caused by an inclination between the virtual projection plane and the real projection plane, according to the imaged information, the distortion correcting section having:
        a correcting-image supply section that supplies, to the image projecting section, a correcting image for use in compensating for a distortion of the output image, and
        an image processing section that determines an amount of a peak shift from a peak in lightness on the virtual projection plane to a peak in lightness on the real projection plane, according to the imaged information using the correcting image, and previously distorts the input image in a manner compensating for a distortion in the output image, according to the peak shift amount determined,
        the correcting-image supply section having a correcting-image modifying section that modifies the correcting-image in a manner approximating, to an angle of the inclination, an amount of an angular change caused by the peak shift, as viewing the peak from the image projecting section.

2. The projector of claim 1, further including a spot light source, the correcting-image supply section modifying the correcting image in a manner approximating a projection characteristic of the image projecting section to the spot light source.

3. The projector of claim 1, the correcting-image supply section modifying the correcting image, according to an image lightness distribution generated depending upon the imaged information and an ideal lightness distribution, in a manner approximating an imaged-lightness distribution to the ideal lightness distribution, the ideal lightness distribution being set up in accordance with at least one of characteristics of the image projecting section and the image-information generating section.

4. The projector of claim 1, the correcting-image supply section modifying the correcting image, according to an imaged-lightness distribution generated based on the imaged information and an ideal lightness distribution, in a manner approximating the imaged-lightness distribution to the ideal lightness distribution, rather than a lightness distribution upon-spot-light-source, the lightness distribution upon-spot-light-source being a lightness distribution configured, provided that a lightness on an optical axis of the image projecting section is Br, to have a lightness of $Br \times \cos^3 \theta$ at a point angle $\theta$ from the optical axis, the ideal lightness distribution being a lightness distribution configured to have a lightness of $Br \times \cos^{3.75} \theta$.

5. The projector of claim 3, the correcting-image supply section having a process mode to repeat the modification until the imaged-lightness distribution and the ideal lightness distributions reach a predetermined criterion of agreement in form.

6. The projector of claim 1, the image processing section having an angle-of-peak determining section that determines an angle-of-peak, as viewed from the image projecting section, as to a peak in lightness on the real projection plane, according to the imaged information using the correcting image, an inclination-angle estimating section that estimates an angle of inclination according to an amount of an angle-of-peak shift as a shift in angle from a reference angle-of-peak to the determined angle-of-peak, as viewed from the image projection section, in lightness on the virtual projection plane, and an image distorting section that previously distorts the input image in a manner compensating for a distortion of the output image according to the estimated angle of inclination.

7. A method of projecting an image using an image projecting section that projects an image to a virtual projection plane arranged in a predetermined positional relationship therewith, according to an input image, the method comprising:

taking an output image projected to a real projection plane;

outputting imaged information containing lightness information that has a correlation to a lightness of an image taken; and correcting a distortion, in an output image for the input image, caused by an inclination between the virtual projection plane and the real projection plane, according to the imaged information, the correcting a distortion including:

supplying, to the image projecting section, a correcting image for use in compensating for the distortion in the output image, determining an amount of a peak shift from a peak in lightness on the virtual projection plane to a peak in lightness on the real projection plane, according to the imaged information using the correcting image, and previously distorting the input image in a manner compensating for a distortion in the output image, according to the peak shift amount determined, and correcting the correcting image in a manner approximating, to an angle of the inclination, an amount of an angular change, caused responsive to the peak shift, as viewing the peak from the image projecting section.

* * * * *